(12) United States Patent
Sobanski (10) Patent No.: US 12,203,392 B2
(45) Date of Patent: Jan. 21, 2025

(54) HEAT EXCHANGER(S) FOR RECOVERING WATER AND/OR HEAT ENERGY FROM TURBINE ENGINE COMBUSTION PRODUCTS

(71) Applicant: Raytheon Technologies Corporation, Farmington, CT (US)

(72) Inventor: Jon E. Sobanski, Glastonbury, CT (US)

(73) Assignee: RTX CORPORATION, Farmington, CT (US)

(*) Notice: Subject to any disclaimer, the term of this patent is extended or adjusted under 35 U.S.C. 154(b) by 28 days.

(21) Appl. No.: 18/117,919

(22) Filed: Mar. 6, 2023

(65) Prior Publication Data

US 2024/0301808 A1  Sep. 12, 2024

(51) Int. Cl.
| | |
|---|---|
| *F02C 7/141* | (2006.01) |
| *F01D 25/32* | (2006.01) |
| *F01K 23/10* | (2006.01) |
| *F02C 3/22* | (2006.01) |
| *F02C 3/30* | (2006.01) |

(52) U.S. Cl.
CPC .............. *F01K 23/10* (2013.01); *F01D 25/32* (2013.01); *F02C 3/22* (2013.01); *F02C 3/30* (2013.01); *F02C 7/141* (2013.01)

(58) Field of Classification Search
CPC ....................................................... F02C 7/141
See application file for complete search history.

(56) References Cited

U.S. PATENT DOCUMENTS

| | | | |
|---|---|---|---|
| 3,266,564 A | 8/1966 | Sabatiuk | |
| 3,604,207 A | 9/1971 | Waidelich | |
| 3,646,760 A | 3/1972 | Waidelich | |
| 7,823,374 B2 | 11/2010 | Venkataramani | |
| 11,603,798 B1 * | 3/2023 | Terwilliger | ............... F02C 7/18 |

(Continued)

FOREIGN PATENT DOCUMENTS

| | | |
|---|---|---|
| DE | 102021201629 A1 | 2/2022 |
| GB | 447283 A | 5/1936 |
| WO | WO-2023237151 A1 * | 12/2023 .............. F02C 3/305 |

OTHER PUBLICATIONS

EP Search Report for EP Patent Application No. 24154827.0 dated Jul. 10, 2024.

*Primary Examiner* — Todd E Manahan
*Assistant Examiner* — Marc Amar
(74) *Attorney, Agent, or Firm* — Getz Balich LLC (57) ABSTRACT

A turbine engine with an axis is provided. This turbine engine includes a fan section, a turbine engine core, a bypass flowpath, an engine housing, an evaporator, a condenser and a core flowpath. The turbine engine core is configured to power the fan section. The turbine engine core includes a core compressor section, a core combustor section and a core turbine section. The bypass flowpath is fluidly coupled with and downstream of the fan section. The engine housing includes a cavity radially outboard of and axially overlapping the fan section and/or the bypass flowpath. The evaporator module is within the cavity. The condenser module is within the cavity. The core flowpath extends sequentially through the core compressor section, the core combustor section, the core turbine section, the evaporator module and the condenser module.

19 Claims, 11 Drawing Sheets

(56) References Cited

U.S. PATENT DOCUMENTS

| | | | | |
|---|---|---|---|---|
| 11,635,022 B1* | 4/2023 | Terwilliger | ............... | F02C 9/00 |
| | | | | 60/775 |
| 2012/0216543 A1* | 8/2012 | Eleftheriou | ............... | F02C 7/10 |
| | | | | 60/39.511 |
| 2015/0377125 A1* | 12/2015 | Kupratis | ................... | F02K 3/06 |
| | | | | 60/774 |
| 2016/0290226 A1* | 10/2016 | Roberge | .................... | F02C 7/32 |
| 2017/0292412 A1* | 10/2017 | Fonseca | ............... | F01D 15/005 |
| 2019/0118955 A1* | 4/2019 | Porte | ...................... | B64D 29/00 |
| 2021/0207500 A1* | 7/2021 | Klingels | ................. | F01K 23/10 |
| 2023/0286661 A1* | 9/2023 | Klingels | ................ | B64D 33/04 |
| 2023/0407768 A1* | 12/2023 | Staubach | .................. | F02K 3/06 |

* cited by examiner

HEAT EXCHANGER(S) FOR RECOVERING WATER AND/OR HEAT ENERGY FROM TURBINE ENGINE COMBUSTION PRODUCTS

GOVERNMENT LICENSE RIGHTS

This invention was made with Government support under Contract DE-AR0001561 awarded by the United States Department of Energy, Office of ARPA-E. The Government has certain rights in this invention.

BACKGROUND OF THE DISCLOSURE

1. Technical Field

This disclosure relates generally to a turbine engine and, more particularly, to recovering water and/or heat energy from combustion products of the turbine engine.

2. Background Information

As government emissions standards tighten, interest in alternative fuels for gas turbine engines continues to grow. There is interest, for example, in fueling a gas turbine engine with hydrogen ($H_2$) fuel rather than a traditional hydrocarbon fuel such as kerosine to reduce greenhouse emissions. Combustion products produced by combusting hydrogen ($H_2$) fuel include water vapor, and exhausted combustion products carry waste heat energy. Various systems and methods are known in the art for recovering the water vapor and/or the heat energy. While these known systems and methods have various advantages, there is still room in the art for improvement.

SUMMARY OF THE DISCLOSURE

According to an aspect of the present disclosure, a turbine engine with an axis is provided. This turbine engine includes a fan section, a turbine engine core, a bypass flowpath, an engine housing, an evaporator, a condenser and a core flowpath. The turbine engine core is configured to power the fan section. The turbine engine core includes a core compressor section, a core combustor section and a core turbine section. The bypass flowpath is fluidly coupled with and downstream of the fan section. The engine housing includes a cavity radially outboard of and axially overlapping the fan section and/or the bypass flowpath. The evaporator module is within the cavity. The condenser module is within the cavity. The core flowpath extends sequentially through the core compressor section, the core combustor section, the core turbine section, the evaporator module and the condenser module.

According to another aspect of the present disclosure, another turbine engine with an axis is provided. This turbine engine includes a fan section, a turbine engine core, a bypass flowpath, an evaporator module, a condenser module and a core flowpath. The turbine engine core is configured to power the fan section. The turbine engine core includes a core compressor section, a core combustor section and a core turbine section. The bypass flowpath is fluidly coupled with and downstream of the fan section. The evaporator module includes an inner section, an outer section and an intermediate section fluidly coupled with and extending radially between the inner section and the outer section. The inner section is radially inboard of and axially overlapped by the bypass flowpath. The outer section is radially outboard of and axially overlaps the fan section and/or the bypass flowpath. The core flowpath extends sequentially through the core compressor section, the core combustor section, the core turbine section, the evaporator module and the condenser module.

According to still another aspect of the present disclosure, another turbine engine is provided. This turbine engine includes a first rotating structure, a turbine engine core, a recovery system and a core flowpath. The first rotating structure is rotatable about an axis. The first rotating structure includes a propulsor rotor and a power turbine rotor. The turbine engine core includes a second rotating structure and a combustor. The second rotating structure includes a core compressor rotor and a core turbine rotor. The power turbine rotor is arranged axially between the propulsor rotor and the second rotating structure. The recovery system includes an evaporator module and a flow circuit. The flow circuit includes a first condenser module and a second condenser module with a port extending through the second condenser module. The flow circuit is configured to circulate a working fluid through the condenser module and the second condenser module. The core flowpath extends sequentially across the core compressor rotor, the combustor, core turbine rotor, the power turbine rotor, the evaporator module and the first condenser module. A portion of the core flowpath crosses the second condenser module through the port.

The evaporator module may include an inner section, an outer section and an intermediate section. The intermediate section may be fluidly coupled with and project through the port in the second condenser module between the inner section and the outer section.

The evaporator module may be arranged axially between the turbine engine core and the condenser module.

The condenser module may be radially outboard of the fan section.

The evaporator module may extend radially across the bypass flowpath.

The evaporator module may include an inner section, an outer section and an intermediate section. The inner section may be radially inboard of and axially overlapped by the bypass flowpath. The outer section may be radially outboard of and axially overlap the bypass flowpath. The intermediate section may be fluidly coupled with and extend radially between the inner section and the outer section.

The evaporator module may extend circumferentially about the axis within the cavity between thirty degrees and one-hundred and sixty degrees.

The core flowpath may extend axially in a first axial direction along the axis into the evaporator module. The core flowpath may extend axially in the first axial direction along the axis out of the evaporator module.

The condenser module may axially overlap the fan section.

The condenser module may project axially away from the fan section towards a forward end of the engine housing.

The condenser module may extend circumferentially about the axis within the cavity between thirty degrees and one-hundred and sixty degrees.

The core flowpath may extend axially in a first axial direction along the axis into the condenser module. The core flowpath may extend axially in a second axial direction along the axis out of the condenser module.

The condenser module may include a water separator disposed at a gravitational bottom side of the turbine engine.

An exhaust out from the core flowpath may be disposed radially outboard of the bypass flowpath.

The turbine engine may also include a recovery system, and the recovery system may include the condenser module and the evaporator module. The condenser module may be configured to condense water vapor flowing through the core flowpath into water, and the recovery system may be configured to collect the water. The evaporator module may be configured to evaporate at least some of the water into steam, and the recovery system may be configured to provide the steam to the turbine engine core.

The recovery system may be configured to provide the steam to the core combustor section.

The turbine engine may also include a fuel system configured to inject hydrogen fuel into a combustion chamber of the core combustor section for combustion.

The turbine engine may also include a flow circuit, and the flow circuit may include the condenser module and a second condenser module. The flow circuit may be configured to circulate a working fluid through the condenser module and the second condenser module. The second condenser module may be arranged radially inboard of the bypass flowpath.

The turbine engine may also include a second bypass flowpath fluidly coupled with and downstream of the fan section. The second bypass flowpath may be radially inboard of the bypass flowpath and extend through the second condenser module.

A port may extend radially through the second condenser module. The evaporator module may project radially through the port.

The turbine engine may also include a second evaporator module and a second condenser module. The core flowpath may include a first heat exchange leg, a second heat exchange leg and a base leg. The first heat exchange leg may branch off from the base leg and extend sequentially through the evaporator module and the condenser module. The second heat exchange leg may branch off from the base leg and extend sequentially through the second evaporator module and the second condenser module.

The turbine engine core may have a reverse flow configuration.

The core turbine section may be arranged axially between the fan section and the core compressor section.

The turbine engine may also include a power turbine section and a rotating structure. The power turbine section may be arranged axially between the fan section and the turbine engine core. The rotating structure may include a fan rotor and a power turbine rotor. The fan rotor may be within the fan section, and the power turbine rotor may be within the power turbine section.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
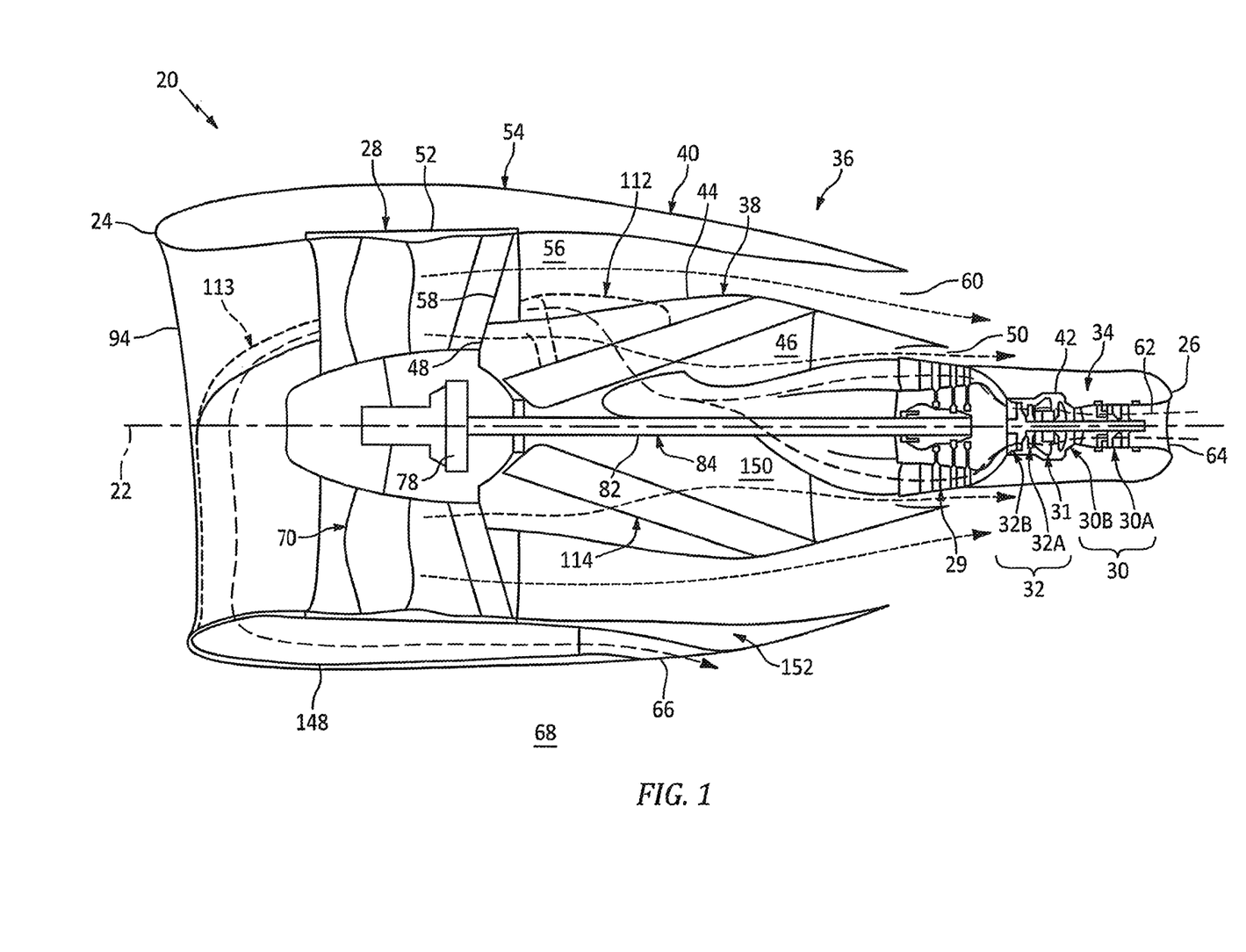
FIG. 1 is a side sectional illustration of a gas turbine engine.

FIG. 1 is a side sectional illustration of a gas turbine engine 20 for an aircraft propulsion system. This turbine engine 20 extends axially along a centerline axis 22 between a forward, upstream end 24 of the turbine engine 20 and an aft, downstream end 26 of the turbine engine 20. The turbine engine 20 includes a fan section 28, a power turbine (PT) section 29 and a turbine engine core 34; e.g., gas generator. The engine core 34 includes a core compressor section 30, a core combustor section 31 and a core turbine section 32. The core compressor section 30 of FIG. 1 includes a low pressure compressor (LPC) section 30A and a high pressure compressor (HPC) section 30B. The core turbine section 32 of FIG. 1 includes a high pressure turbine (HPT) section 32A and a low pressure turbine (LPT) section 32B.

The fan section 28, the PT section 29 and the engine core 34 are arranged sequentially along the axis 22 within an engine housing 36. This engine housing 36 includes a housing inner structure 38 and a housing outer structure 40.

The inner structure 38 includes an inner case 42 and an inner nacelle 44. The inner case 42 houses any one or more or all of the engine sections 29-32B. The inner nacelle 44 houses and provides an aerodynamic cover over at least the inner case 42. The inner nacelle 44 of FIG. 1 also forms an outer peripheral boundary of an inner bypass flowpath 46 radially within the inner structure 38. This inner bypass flowpath 46 extends longitudinally (e.g., generally axially) within the inner structure 38 from an inlet 48 into the inner bypass flowpath 46 to an exhaust 50 out from the inner bypass flowpath 46. The inner bypass inlet 48 is fluidly coupled with and arranged downstream of the fan section 28, for example axially adjacent the fan section 28. The inner bypass exhaust 50 is arranged axially aft, downstream of the inner bypass inlet 48, for example radially outboard of and/or axially aligned with the PT section 29.

The outer structure 40 includes an outer case 52 and an outer nacelle 54. The outer case 52 houses at least the fan section 28. The outer nacelle 54 houses and provides an aerodynamic cover over at least the outer case 52. The outer nacelle 54 of FIG. 1 is also disposed radially outboard of, extends circumferentially about (e.g., circumscribes) and extends axially along (e.g., overlaps) at least a forward portion of the inner nacelle 44. With this arrangement, the inner structure 38 and its inner nacelle 44 and the outer structure 40 and its outer nacelle 54 form an outer bypass flowpath 56 within the engine housing 36. This outer bypass flowpath 56 is disposed radially outboard of, extends circumferentially about (e.g., circumscribes) and extends axially along (e.g., overlaps) at least a forward portion of the inner bypass flowpath 46. The outer bypass flowpath 56 extends longitudinally (e.g., generally axially) within the engine housing 36 (e.g., radially between the inner structure 38 and the outer structure 40) from an inlet 58 into the outer bypass flowpath 56 to an exhaust 60 out from the outer bypass flowpath 56. The outer bypass inlet 58 is fluidly coupled with and arranged downstream of the fan section 28, for example axially adjacent the fan section 28. The outer bypass flowpath 56 is also radially outboard of and/or axially aligned with the inner bypass inlet 48. The outer bypass exhaust 60 is arranged axially aft, downstream of the outer bypass inlet 58, for example radially outboard of and/or axially aligned with (or proximate) the PT section 29. The outer bypass exhaust 60 may also be disposed axially forward of and/or radially outboard of the inner bypass exhaust 50.

A core flowpath 62 extends sequentially through the LPC section 30A, the HPC section 30B, the combustor section 31, the HPT section 32A, the LPT section 32B and the PT section 29 from an inlet 64 into the core flowpath 62 to an exhaust 66 out from the core flowpath 62. The core inlet 64 of FIG. 1 is disposed at (e.g., on, adjacent or proximate) the engine downstream end 26. This core inlet 64 is formed by the inner structure 38. The core exhaust 66 of FIG. 1 is disposed axially forward of the core inlet 64. The core exhaust 66 of FIG. 1, for example, is disposed radially outboard of the outer bypass flowpath 56, and the core exhaust 66 may be axially between the fan section 28 and the PT section 29. This core exhaust 66 is formed by the outer structure 40. The core exhaust 66 may be adjacent and fluidly coupled with an environment 68 external to (e.g., outside of) the turbine engine 20. However, it is contemplated the core exhaust 66 may alternative be adjacent and fluidly coupled with the outer bypass flowpath 56.

Figure 2:
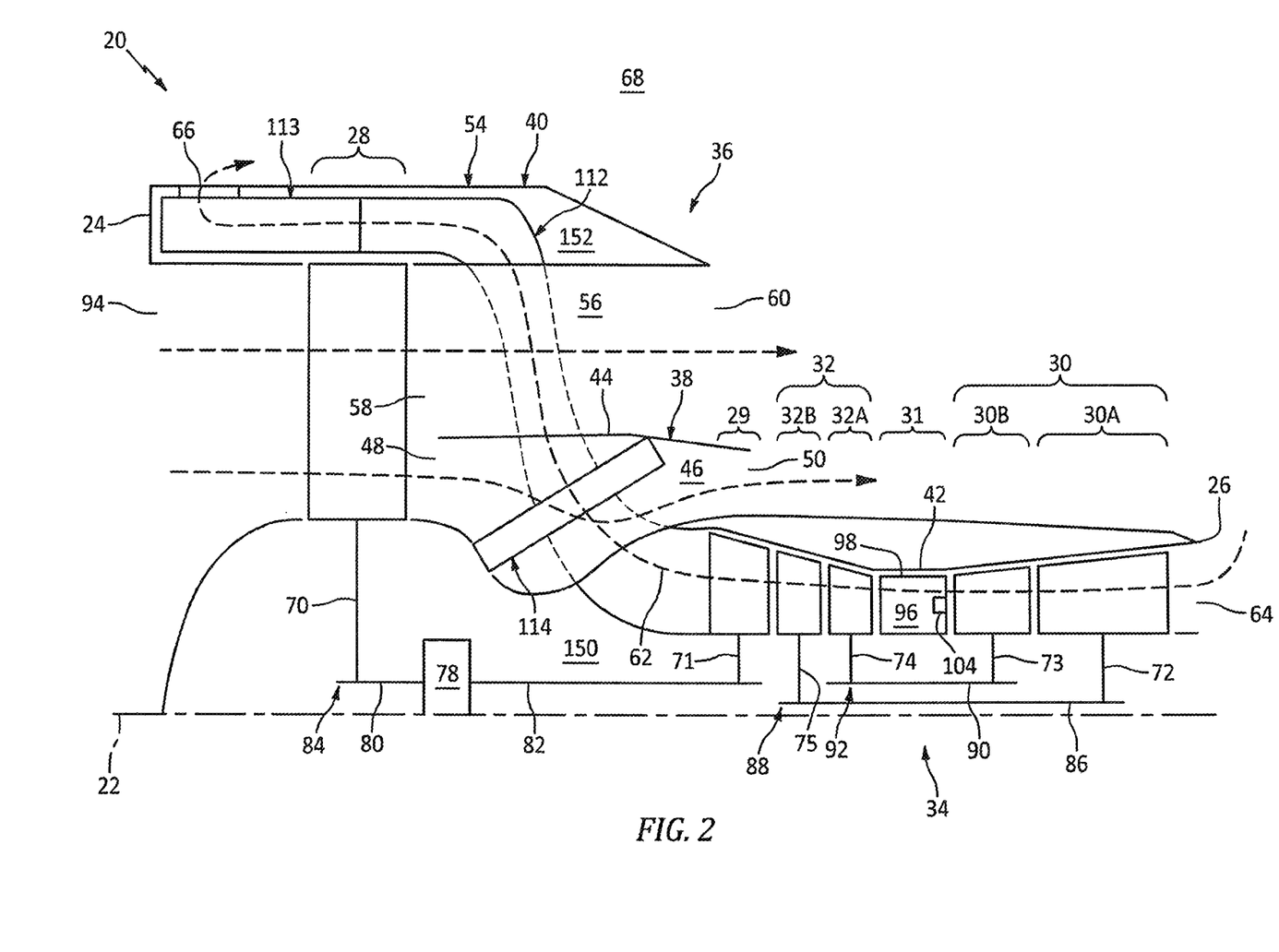
FIG. 2 is a partial schematic illustration of the turbine engine.

Referring to FIG. 2, the engine core 34 may be configured as a reverse flow engine core. The core flowpath 62 of FIG. 2, for example, extends through any one or more or all of the engine sections 30A-32B and 29 in an axially forward direction. Similarly, the turbine engine 20 is configured to move through the external environment 68 in the axially forward direction; e.g., during forward aircraft flight. By contrast, each bypass flowpath 46, 56 extends axially within the turbine engine 20 and its engine housing 36 in an axially aft direction that is opposite the axially forward direction. With such an arrangement, the engine sections 30A-32B, 29 and 28 may be arranged sequentially along the axis 22 between the engine downstream end 26 and the engine upstream end 24.

Each of the engine sections 28, 29, 30A, 30B, 32A and 32B of FIG. 2 includes a respective bladed rotor 70-75. Each of these bladed rotors 70-75 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 70 is connected to a geartrain 78 through a fan shaft 80. The geartrain 78 is connected to the PT rotor 71 through a power turbine (PT) shaft 82. At least (or only) the fan rotor 70, the fan shaft 80, the geartrain 78, the PT shaft 82 and the PT rotor 71 collectively form a fan rotating structure 84. This fan rotating structure 84 of FIG. 2 is configured as a geared rotating structure where, for example, the PT rotor 71 rotates at a different (e.g., faster) speed than the fan rotor 70. However, it is contemplated the fan rotating structure 84 may alternatively be a direct drive rotating structure where, for example, the fan shaft 80 and the geartrain 78 are omitted and the PT shaft 82 directly connects the fan rotor 70 and the PT rotor 71 together. Referring again to FIG. 2, the LPC rotor 72 is connected to the LPT rotor 75 through a low speed shaft 86. At least (or only) the LPC rotor 72, the low speed shaft 86 and the LPT rotor 75 collectively form a low speed rotating structure 88 of the engine core 34. The HPC rotor 73 is connected to the HPT rotor 74 through a high speed shaft 90. At least (or only) the HPC rotor 73, the high speed shaft 90 and the HPT rotor 74 collectively form a high speed rotating structure 92 of the engine core 34. Each of the engine rotating structures 84, 88, 92 may be rotatable about the axis 22; e.g., a rotational axis. These engine rotating structures 84, 88 and 92 may be rotatably connected to and supported by the engine housing 36 and its inner structure 38 through a plurality of bearings.

During operation, air enters the turbine engine 20 and its engine core 34 at the engine downstream end 26 through the core inlet 64. This air directed into the core flowpath 62 may be referred to as "core air". Air also enters the turbine engine 20 at the engine upstream end 24 through a forward engine inlet 94. This air is directed through the fan section 28 and into the inner bypass flowpath 46 and into the outer bypass flowpath 56; e.g., in parallel. The air within the outer bypass flowpath 56 may be referred to as "bypass air". The air within the inner bypass flowpath 46 may be referred to as "cooling air".

The core air is compressed by the LPC rotor 72 and the HPC rotor 73 and directed into a combustion chamber 96 of a combustor 98 (e.g., an annular combustor) in the combustor section 31. Fuel is injected into the combustion chamber 96 and mixed with the compressed core air to provide a fuel-air mixture. This fuel-air mixture is ignited and combustion products thereof flow through and sequentially cause the HPT rotor 74, the LPT rotor 75 and the PT rotor 71 to rotate. The rotation of the HPT rotor 74 and the LPT rotor 75 respectively drive rotation of the HPC rotor 73 and the LPC rotor 72 and, thus, compression of the air received from the core inlet 64. The rotation of the PT rotor 71 (e.g., independently) drives rotation of the fan rotor 70. The rotation of the fan rotor 70 propels the bypass air through and out of the outer bypass flowpath 56 and propels the cooling air through and out of the inner bypass flowpath 46. The propulsion of the bypass air may account for a majority of thrust generated by the turbine engine 20.

Figure 3:
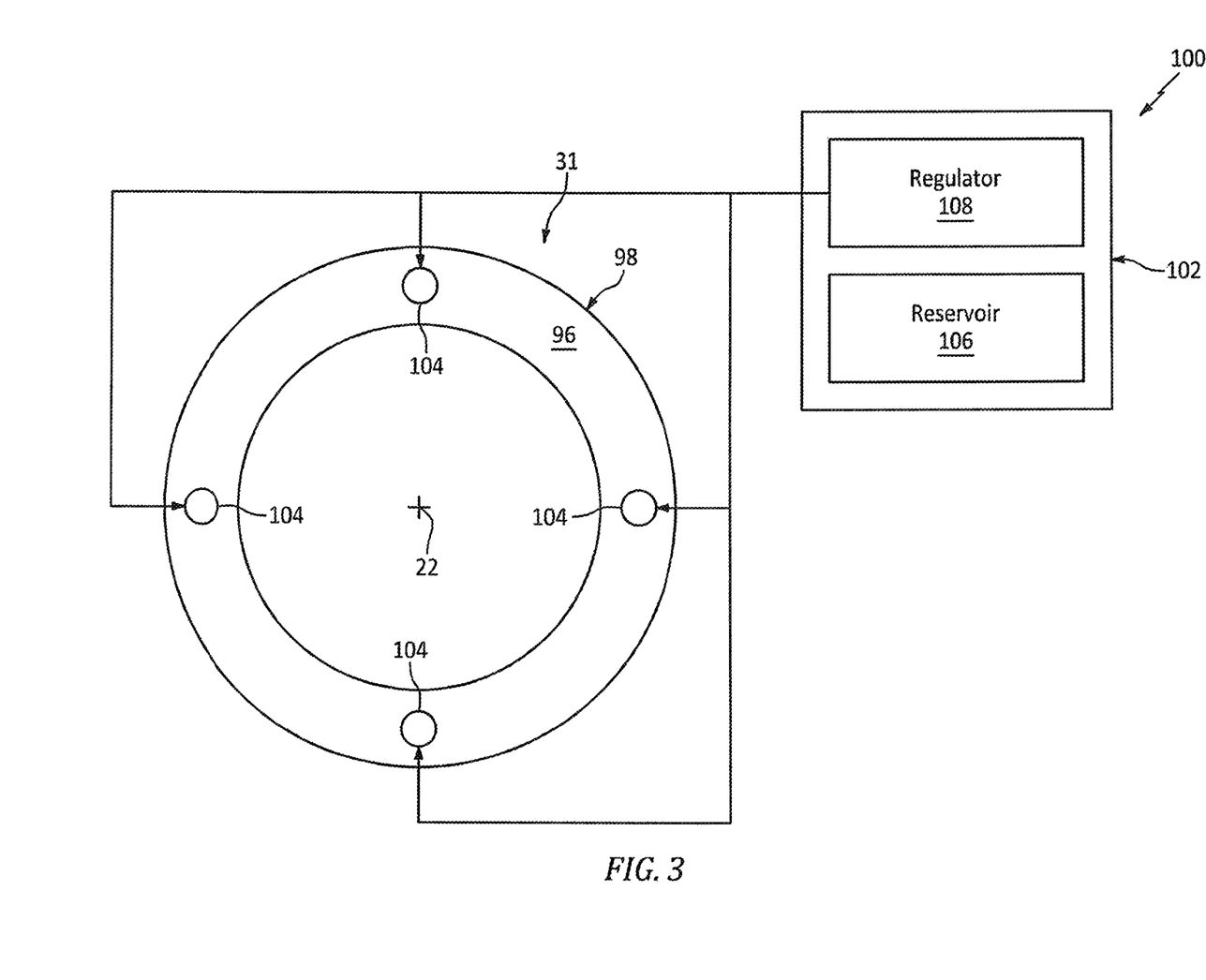
FIG. 3 is a schematic illustration of a fuel system for the turbine engine.

Referring to FIG. 3, the turbine engine 20 includes a fuel system 100 for delivering the fuel to the combustor 98. This fuel system 100 includes a fuel source 102 and one or more fuel injectors 104. The fuel source 102 of FIG. 3 includes a fuel reservoir 106 and/or a fuel flow regulator 108; e.g., a valve. The fuel reservoir 106 is configured to store the fuel before, during and/or after turbine engine operation. The fuel reservoir 106, for example, may be configured as or otherwise include a tank, a cylinder, a pressure vessel, a bladder or any other type of fuel storage container. The fuel flow regulator 108 is configured to direct and/or meter a flow of the fuel from the fuel reservoir 106 to the fuel injectors 104. The fuel injectors 104 may be arranged circumferentially about the axis 22 in an array. Each fuel injector 104 is configured to direct the fuel received from the fuel source 102 into the combustion chamber 96 for mixing with the compressed core air to provide the fuel-air mixture.

The turbine engine 20 of FIGS. 1 and 2 may be configured as a non-hydrocarbon turbine engine/a hydrocarbon free turbine engine. The turbine engine 20, for example, may be configured as a hydrogen fueled turbine engine. The fuel injected into the combustion chamber 96 by the fuel injectors 104, for example, may be hydrogen ($H_2$) fuel; e.g., $H_2$ gas. The present disclosure, however, is not limited to hydrogen fueled turbine engines nor to non-hydrocarbon turbine engines. The turbine engine 20, for example, may also or alternatively be fueled by another non-hydrocarbon fuel such as, but not limited to, ammonia ($NH_3$). The turbine engine 20 may still also or alternatively be fueled using any other fuel, including hydrocarbon fuels (e.g., kerosene, jet fuel, sustainable aviation fuel (SAF), etc.), which produces combustion products that include water ($H_2O$) vapor.

Figure 4:
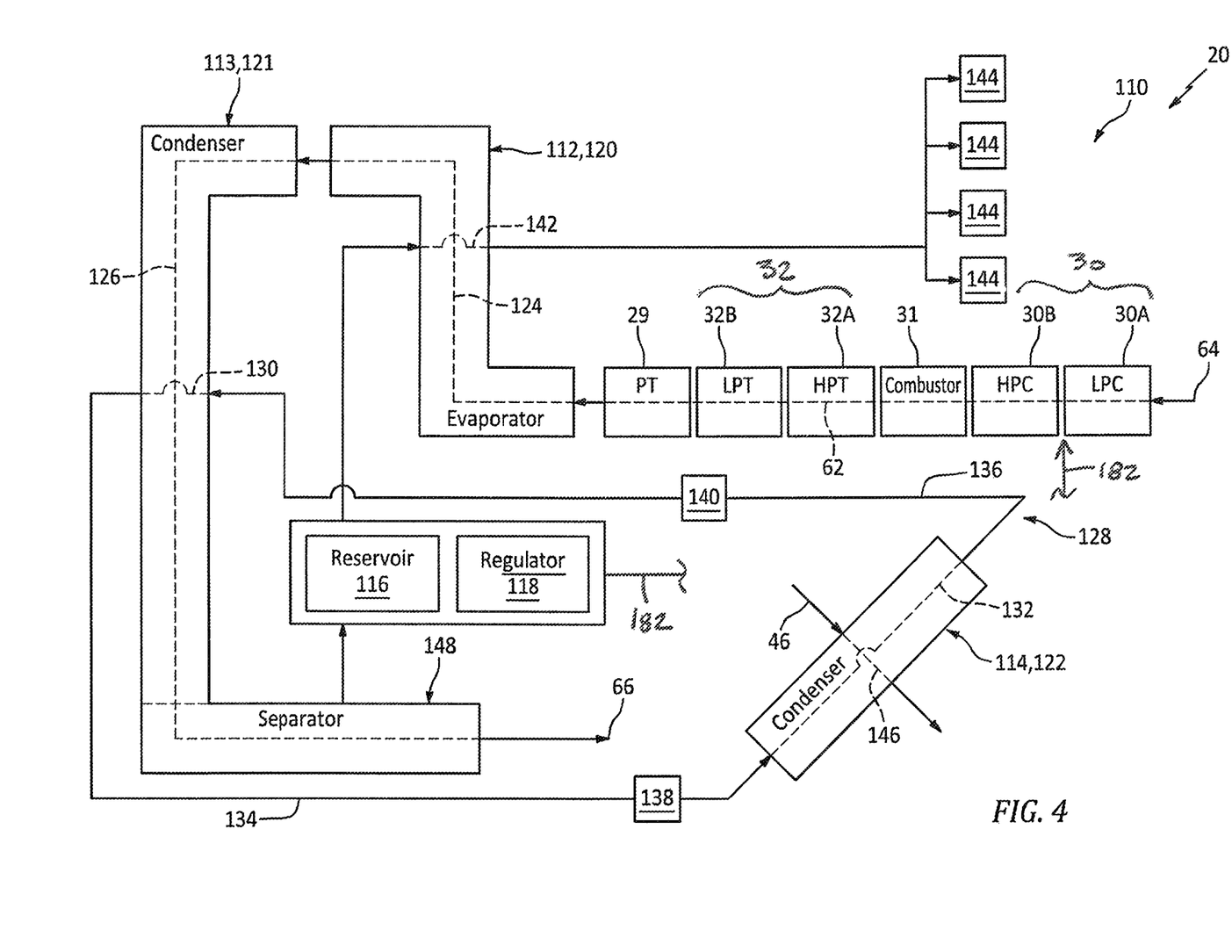
FIG. 4 is a schematic illustration of a water and heat energy recovery system arranged with other components of the turbine engine.

Referring to FIG. 4, the turbine engine 20 also includes a water and heat energy recovery system 110. This recovery system 110 is configured to recover at least some of the water vapor produced by the combustion of the fuel-air mixture within the combustion chamber 96 (see FIG. 2). The recovery system 110 is also configured to evaporate the recovered water using heat energy recuperated from the combustion products to provide steam for use in the engine core 34; e.g., in the combustor section 31. The recovery system 110 of FIG. 4, for example, includes a (e.g., arcuate) water evaporator module 112 and a (e.g., arcuate) water condenser module 113. The recovery system 110 may also include a (e.g., annular or arcuate) refrigerant condenser module 114, a water reservoir 116 and/or a system flow regulator 118 (e.g., a pump and/or a valve).

The water evaporator module 112 includes a water evaporator 120. The water condenser module 113 includes a water condenser 121. The refrigerant condenser module 114 includes a refrigerant condenser 122. Each heat exchanger 120, 121, 122 may form an entirety of the respective heat exchanger module 112, 113, 114. Alternatively, one or more or all of the heat exchangers 120, 121, 122 may each form a select section of the respective heat exchanger module 112, 113, 114, or that heat exchanger 120, 121, 122 may be divided into a plurality of heat exchange units which form a plurality of discrete sections of the heat exchanger module 112, 113, 114. Where the heat exchanger 120, 121, 122 forms one or more sections of the respective heat exchanger module 112, 113, 114, one or more other sections of the respective heat exchange module 112, 113, 114 may be formed by flowpath conduit(s); e.g., duct(s), pipe(s), hose(s), etc. However, for ease of description, each heat exchange module 112, 113, 114 may generally be described below as being completely or substantially formed by the respective heat exchanger 120, 121, 122.

The water evaporator module 112 and the water condenser module 113 are fluidly coupled inline with the core flowpath 62. For example, the core flowpath 62 of FIG. 4 extends from the PT section 29, sequentially through a gas (e.g., combustion products) flowpath 124 of the water evaporator module 112 and its water evaporator 120 and a gas (e.g., combustion products) flowpath 126 of the water condenser module 113 and its water condenser 121, to the core exhaust 66.

The water condenser module 113 and the refrigerant condenser module 114 are configured together in a refrigerant flow circuit 128. For example, a working fluid (e.g., refrigerant) flowpath 130 of the water condenser module 113 and its water condenser 121 and a working fluid (e.g., refrigerant) flowpath 132 of the refrigerant condenser module 114 and its refrigerant condenser 122 are fluidly coupled in a loop by a working fluid first passage 134 and a working fluid second passage 136. The first passage 134 may direct a working fluid (e.g., refrigerant or another coolant) from the water condenser module 113 and its fluid flowpath 130 to the refrigerant condenser module 114 and its fluid flowpath 132. The second passage 136 may direct the working fluid from the refrigerant condenser module 114 and its fluid flowpath 132 to the water condenser module 113 and its fluid flowpath 130. This refrigerant flow circuit 128 may also include a refrigerant flow regulator 138, 140 (e.g., a compressor, a pump and/or a valve) arranged inline with one or both of the working fluid passages 134, 136 to regulate circulation of the working fluid through the water condenser module 113 and the refrigerant condenser module 114.

The water reservoir 116 is configured to hold water before, during and/or after turbine engine operation. The water reservoir 116, for example, may be configured as or otherwise include a tank, a cylinder, a pressure vessel, a bladder or any other type of water storage container. The water reservoir 116 of FIG. 4 is fluidly coupled with and between the water condenser gas flowpath 126 and a water flowpath 142 of the water evaporator module 112 and its water evaporator 120. The system flow regulator 118 is arranged with the water reservoir 116, and configured to direct and/or meter a flow of the water from the water reservoir 116 to one or more other components 144 of the turbine engine 20. One or more of the turbine engine components 144 may each be configured as or otherwise include a steam injector. Each steam injector may be configured to inject the steam into the combustion chamber 96 (see FIG. 2). One or more of the turbine engine components 144 may also or alternatively be configured as an outlet for introducing the steam for cooling the combustor 98; e.g., a combustor wall, etc. The present disclosure, however, is not limited to the foregoing exemplary turbine engine components 144 which utilize the steam. In particular, various other uses for steam in a turbine engine are known in the art, and the present disclosure is not limited to any particular one thereof.

During operation of the recovery system 110, relatively cool cooling air is directed into an air flowpath 146 of the refrigerant condenser module 114 and its refrigerant condenser 122. The working fluid is directed into the refrigerant condenser fluid flowpath 132. The refrigerant condenser module 114 and its refrigerant condenser 122 exchange heat energy between the cooling air flowing within the refrigerant condenser air flowpath 146 and the working fluid flowing within the refrigerant condenser fluid flowpath 132. The working fluid flowing within the refrigerant condenser fluid flowpath 132 is typically warmer than the cooling air flowing within the refrigerant condenser air flowpath 146. The refrigerant condenser module 114 and its refrigerant condenser 122 are thereby operable to cool the working fluid using the cooling air. This cooling air is received through the inner bypass flowpath 46 (see also FIGS. 1 and 2).

The cooled working fluid is directed into the water condenser fluid flowpath 130. The relatively hot combustion products, including the water vapor, are directed into the water condenser gas flowpath 126. The water condenser module 113 and its water condenser 121 exchange heat energy between the working fluid flowing within the water condenser fluid flowpath 130 and the combustion products flowing within the water condenser gas flowpath 126. The combustion products flowing within the water condenser gas flowpath 126 are typically warmer than the working fluid flowing within the water condenser fluid flowpath 130. The water condenser module 113 and its water condenser 121 are thereby operable to cool the combustion products using the working fluid. This cooling of the combustion products may condense at least some of the water vapor (e.g., the gaseous water) flowing within the water condenser gas passage into liquid water droplets. At least some or all of the liquid water may be collected and separated from the remaining gaseous combustion products by a water separator 148 and subsequently directed to the water reservoir 116 for (e.g., temporary) storage. Here, the separator 148 is configured as or otherwise includes a gutter integrated into (or connected downstream of) the water condenser module 113. However, various other types of separators are known in the art, and the present disclosure is not limited to any particular ones thereof.

The system flow regulator 118 directs the water from the water reservoir 116 into and through the water evaporator water flowpath 142. The relatively hot combustion products are further directed through the water evaporator gas flowpath 124, for example, prior to flowing through the water condenser gas flowpath 126. The water evaporator module 112 and its water evaporator 120 exchange heat energy between the water flowing within the water evaporator water flowpath 142 and the combustion products flowing within the water evaporator gas flowpath 124. The combustion products flowing within the water evaporator gas flowpath 124 are typically warmer than the liquid water flowing within the water evaporator water flowpath 142. The water evaporator module 112 and its water evaporator 120 are thereby operable to heat the water using the combustion products and thereby recuperate the heat energy from the combustion products. This heating of the water may evaporate at least some or all of the liquid water flowing within the water evaporator water flowpath 142 into gaseous water-steam. At least some of this steam is directed to the turbine engine components 144 for use in the engine core 34; e.g., use in the combustor section 31.

Referring to FIGS. 5-8, the water evaporator module 112 may be configured to radially cross the inner bypass flowpath 46 and the outer bypass flowpath 56 from an inner cavity 150 (e.g., an annular volume, an arcuate volume, compartment, chamber, etc.) of the inner structure 38 to an outer cavity 152 (e.g., an annular volume, an arcuate volume, compartment, chamber, etc.) of the outer structure 40. The water evaporator module 112 of FIGS. 5-8, for example, includes an inner section 156, an outer section 158 and an intermediate section 160.

The inner section 156 is disposed within the inner cavity 150. This inner section 156 projects axially out (or otherwise away) from a forward, downstream end of the PT section 29 along the axis 22. The inner section 156 extends circumferentially about the axis 22 more than, for example, ninety degrees (90°); e.g., between one-hundred and sixty degrees (160°) and one-hundred and eighty degrees (180°). With this arrangement, the water evaporator module 112 and its inner section 156 extend circumferentially about and/or axially along the PT shaft 82. Each bypass flowpath 46, 56 is disposed radially outboard of, extends circumferentially about (e.g., circumscribes) and/or extends axially along (e.g., overlaps) the water evaporator module 112 and its inner section 156. Here, the inner section 156 is housed within the inner structure 38 and its inner nacelle 44.

The outer section 158 is disposed within the outer cavity 152. This outer section 158 projects axially out (or otherwise away) from an aft, upstream end of the water condenser module 113 along the axis 22. The outer section 158 extends circumferentially about the axis 22 between, for example, thirty degrees (30°) and one-hundred and sixty degrees (160°); e.g., between sixty degrees (60°) and one-hundred and twenty degrees (120°). With this arrangement, the water evaporator module 112 and its outer section 158 extend circumferentially about and/or axially along the fan section 28 and/or the outer bypass flowpath 56. Here, the outer section 158 is housed within the outer structure 40 and, more particularly, radially between (A) an outer skin 162 (e.g., cowl) of the outer nacelle 54 and (B) the outer case 52 and/or an aft inner skin 164 (e.g., barrel) of the outer nacelle 54.

The intermediate section 160 is fluidly coupled with and between the inner section 156 and the outer section 158. The intermediate section 160, for example, extends radially between and to the inner section 156 and the outer section 158. With this arrangement, the water evaporator module 112 and its intermediate section 160 extend radially across the inner bypass flowpath 46 and the outer bypass flowpath 56. The intermediate section 160 may also project radially through a port 166 (e.g., an opening, a window, etc.) of the refrigerant condenser module 114 in order to cross the refrigerant condenser module 114.

The water condenser module 113 may be configured radially outboard of and axially forward of the fan section 28. The water condenser module 113, for example, is disposed in the outer cavity 152. The water condenser module 113 projects axially out (or otherwise away) from a forward, downstream end of the water condenser module 113 along the axis 22 to a forward end 168 of the water condenser module 113. This forward end 168 may be spaced axially forward from the fan section 28 such that the water condenser module 113 projects axially forward from the fan section 28 to or about the engine upstream end 24. The water condenser module 113 extends circumferentially about the axis 22 between, for example, thirty degrees (30°) and one-hundred and sixty degrees (160°); e.g., between sixty degrees (60°) and one-hundred and twenty degrees (120°). With this arrangement, the water condenser module 113 extends circumferentially about and/or axially along the fan section 28. Here, the water condenser module 113 is housed within the outer structure 40 and, more particularly, radially between (A) the outer skin 162 of the outer nacelle 54 and (B) the outer case 52 and/or a forward inner skin 170 (e.g., barrel) of the outer nacelle 54.

The separator 148 may be arranged at a gravitational bottom side of the turbine engine 20 and its outer structure 40. With this arrangement, gravity may aid in the collection of the condenser water droplets within (or downstream of) the water condenser module 113.

Figure 5:
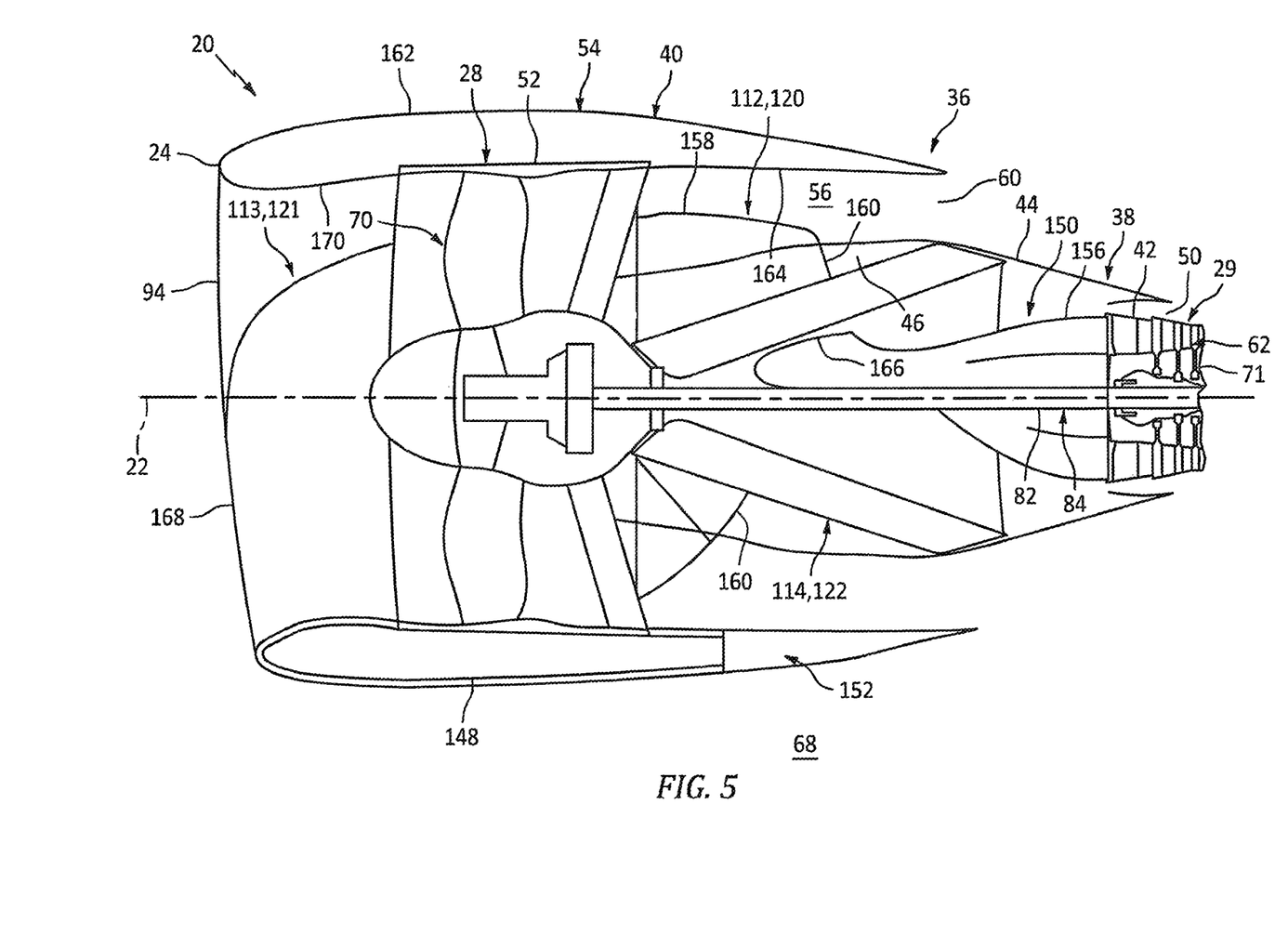
FIG. 5 is a partial side sectional illustration of a forward portion of the turbine engine.
Figure 6:
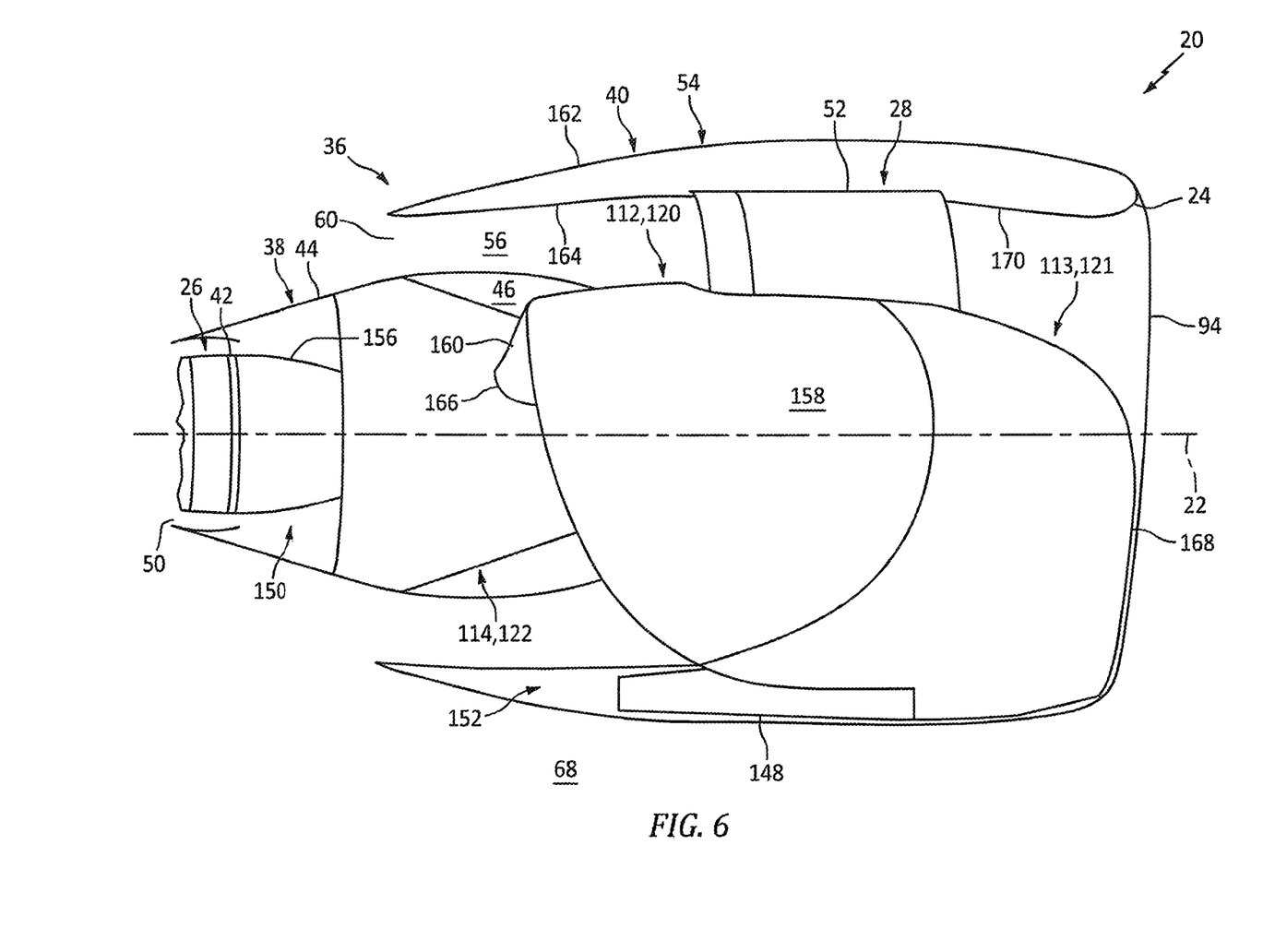
FIG. 6 is a partial side cutaway illustration of the forward portion of the turbine engine.
Figure 7:
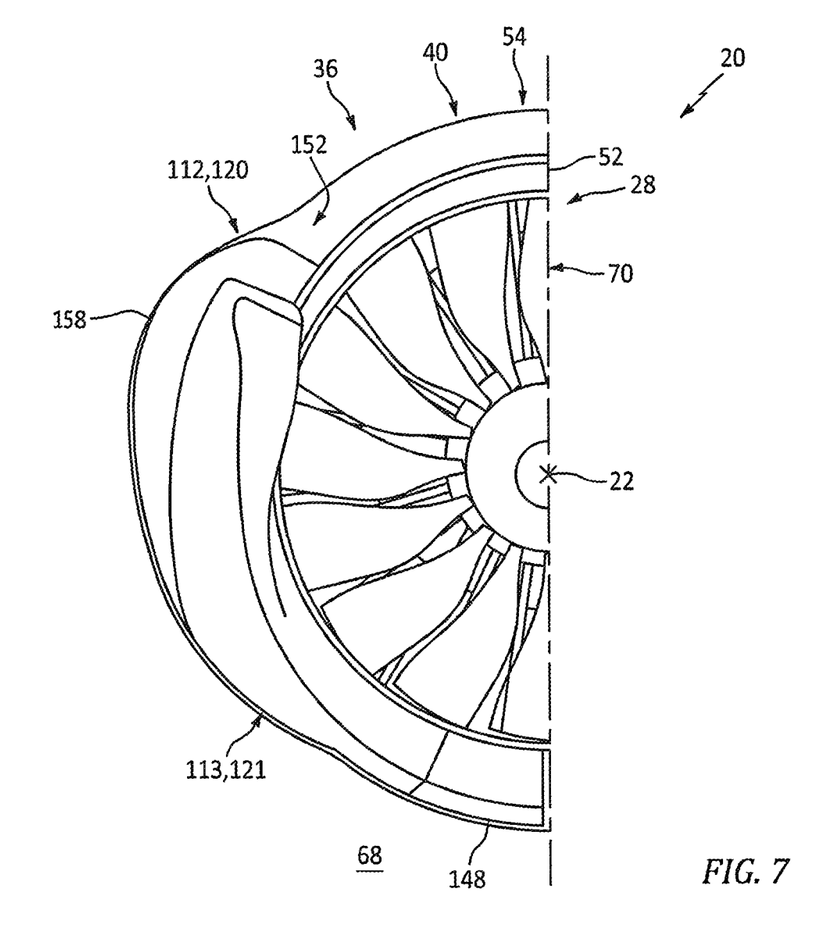
FIG. 7 is a partial front view illustration of the turbine engine.
Figure 8:
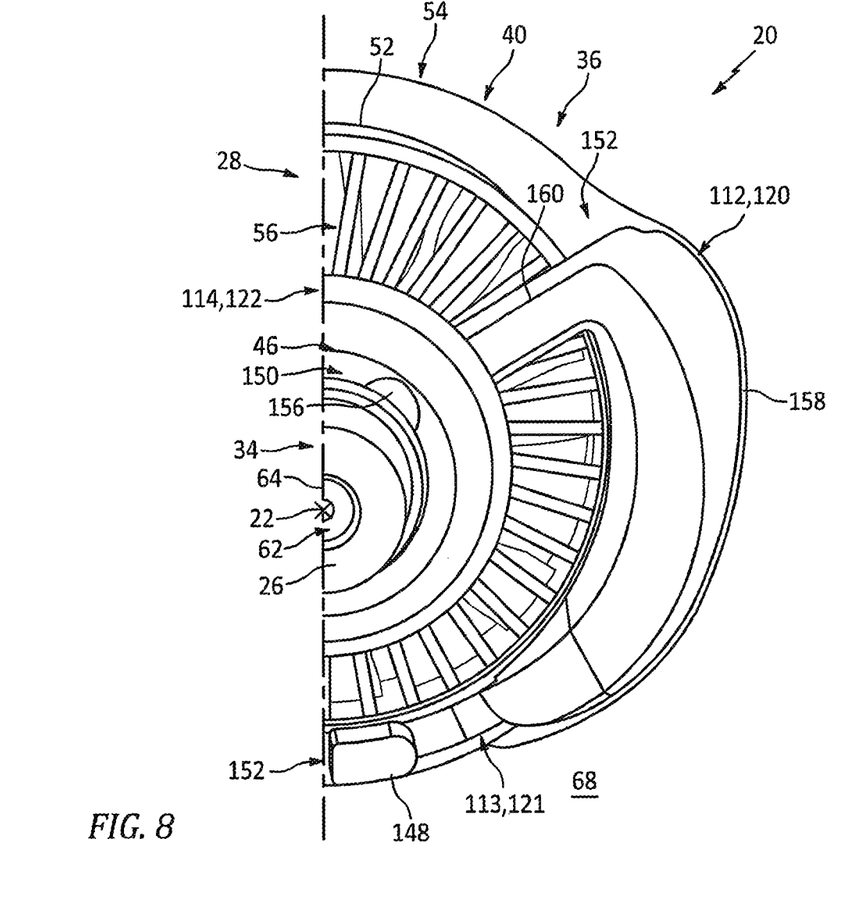
FIG. 8 is a partial aft view illustration of the turbine engine.

Referring to FIG. 5, the core flowpath 62 extends axially in the forward direction out of the PT section 29 and into the water evaporator module 112 and its inner section 156. The core flowpath 62 extends radially through the intermediate section 160 from the inner section 156 to the outer section 158. The core flowpath 62 extends axially in the forward direction out of the water evaporator module 112 and its outer section 158 and into the water condenser module 113. The core flowpath 62 extends circumferentially within the water condenser module 113 about the axis 22 and along the engine upstream end 24. The core flowpath 62 extends axially in the aft direction out of the water condenser module 113 and then axially and/or radially out of the core exhaust 66 (see FIG. 1).

The refrigerant condenser module 114 is configured radially inboard of the outer bypass flowpath 56. More particularly, the refrigerant condenser module 114 is disposed within and/or partially forms a longitudinal section of the inner bypass flowpath 46. The refrigerant condenser module 114, for example, may be disposed within the inner cavity 150. The refrigerant condenser module 114 of FIG. 5 is disposed radially outboard of, extends circumferentially about and/or extends axially along (e.g., overlaps) the PT shaft 82. The refrigerant condenser module 114 may have an arcuate, frustoconical geometry. The refrigerant condenser module 114 of FIG. 5, for example, radially tapers inwards towards the axis 22 as the refrigerant condenser module 114 extends axially in the forward direction along the axis 22.

Figure 9A:
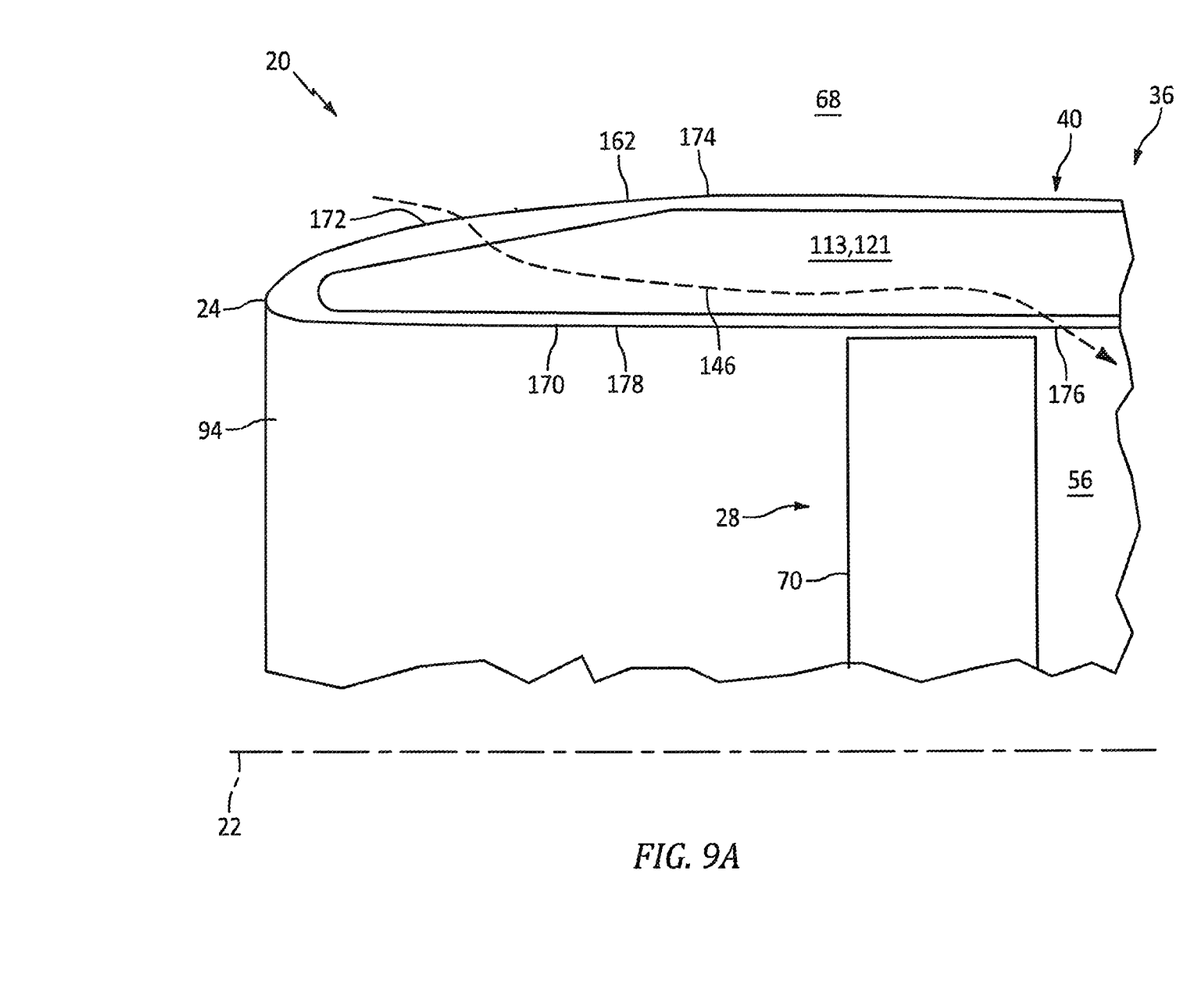
FIGS. 9A and 9B are partial side sectional illustrations of a portion of the turbine engine with a water condenser and various inlet scoop arrangements.
Figure 9B:
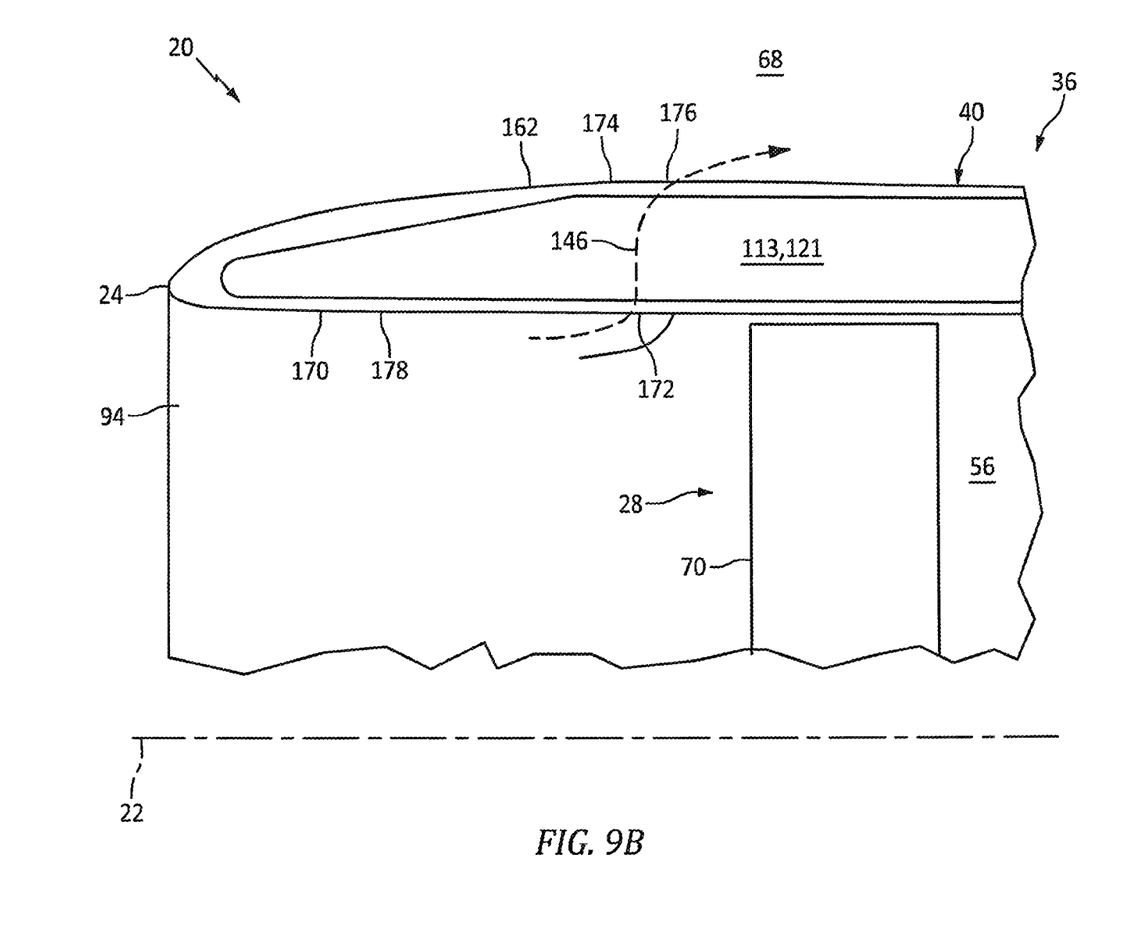

The refrigerant condenser module 114 is described above as a discrete component from the water condenser module 113. However, referring to FIGS. 9A and 9B, it is contemplated the refrigerant condenser module 114 may alternatively be omitted. The water condenser module 113 of FIGS. 9A and 9B, for example, may include the air flowpath 146. Referring to FIG. 9A, an inlet 172 to the air flowpath 146 may be arranged at an outer side 174 of the outer structure 40, and an outlet 176 out from the air flowpath 146 may be arranged at an inner side 178 of the outer structure 40. Alternatively, referring to FIG. 9B, the inlet 172 to the air flowpath 146 may be arranged at the inner side 178 of the outer structure 40, and the outlet 176 from the air flowpath 146 may be arranged at the outer side 174 of the outer structure 40. In such embodiments, the air flowpath 146 may take the place of the water condenser fluid flowpath 130 described above.

Figure 10:
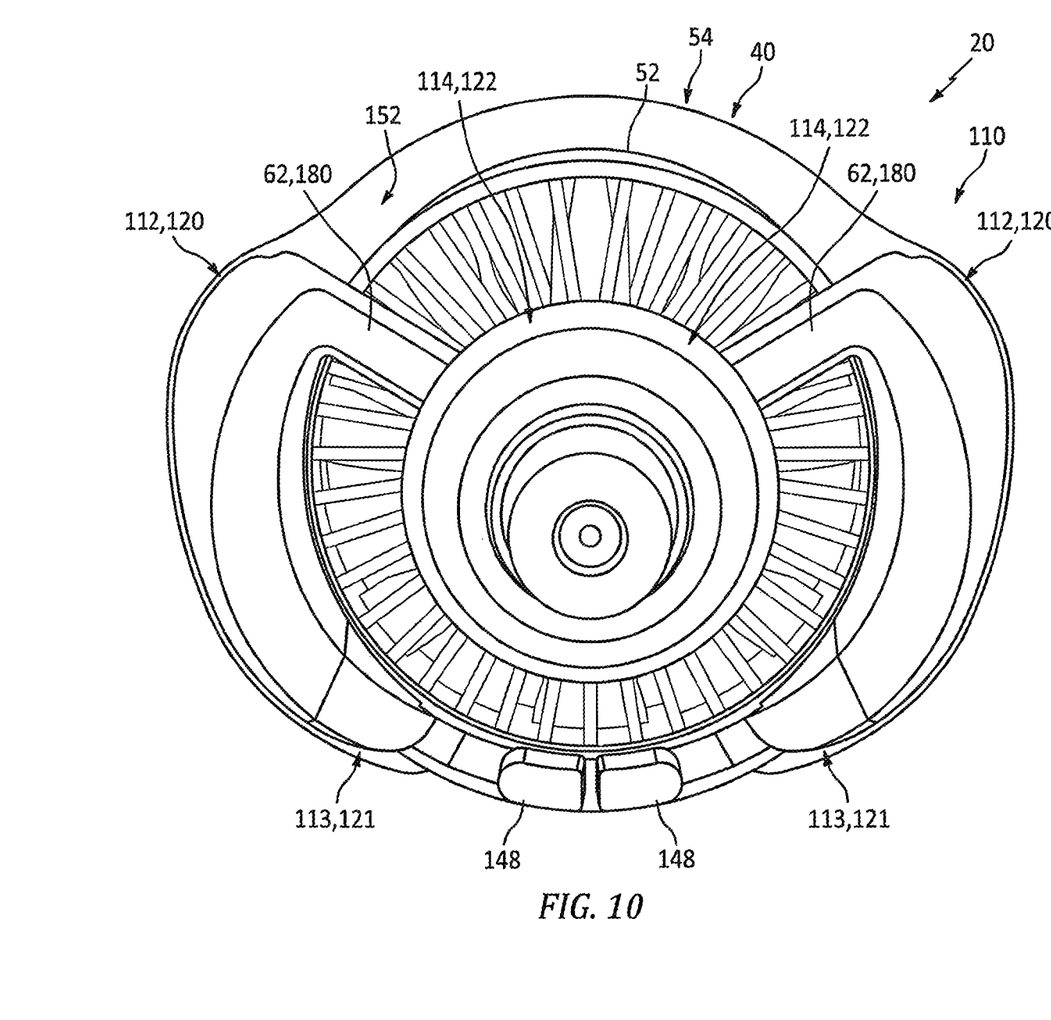
FIG. 10 is a partial aft view illustration of the turbine engine.

In some embodiments, referring to FIG. 4, the recovery system 110 may include a single one of each heat exchanger module 112, 113, 114. In other embodiments, referring to FIG. 10, the recovery system 110 may include multiple of each heat exchanger module 112, 113, 114. In such embodiments, the core flowpath 62 may include a base leg and multiple heat exchange legs 180 which branch off from the base leg; e.g., a common annular portion of the core flowpath 62 within the PT section 29 (see FIGS. 1 and 2). Each heat exchange leg 180 of FIG. 10 extends sequentially through a respective one of the water evaporator modules 112 and a respective one of the water condenser modules 113 to a respective core exhaust 66 (see FIG. 1). With such an arrangement, the multiple heat exchange legs 180 provide operational redundancy. Thus, even in an unlikely event that one or more of the heat exchangers 120, 121, 122 in one of the heat exchange legs 180 becomes clogged or otherwise loses efficiency and/or operability, the heat exchangers 120, 121 and 122 in the other heat exchanger leg 180 may still operate and facilitate continued turbine engine operation until, for example, the aircraft may land and the turbine engine 20 may be inspected, serviced and/or repaired. Furthermore, by positioning the heat exchangers 120 and 121 radially outboard of the fan section 28 and/or the outer bypass flowpath 56, the heat exchangers 120 and 121 may be readily accessed via an exterior cowl door (or doors) for inspection, service, repair and/or replacement.

In some embodiments, the recovery system 110 may also include a water circuit 182 (as illustrated in FIG. 4). This water circuit 182 is configured to introduce water into the core flowpath 62 for intercooling. The water circuit 182 of FIG. 4, for example, selectively directs (e.g., injects) water received from the water reservoir 116 into the core flowpath 62 within the compressor section 30; e.g., between the LPC section 30A and the HPC section 30B. Of course, in other embodiments, the water circuit 182 may direct the water to other areas of the engine core 34. In still other embodiments, the water circuit 182 may be omitted.

In some embodiments, referring to FIG. 1, the engine core 34 may be configured as a replaceable module. The engine core 34, for example, may be configured to be installed and removed by attaching and removing the engine core 34 from a portion of the inner case 42 surrounding the PT rotor 71 (see FIG. 2). With such an arrangement, turbine engine downtime may be reduced by, for example, swapping a used engine core out for a replacement engine core. The used engine core may then be inspected and/or repaired at another location and/or at another time while the turbine engine 20 may continue to operate with the replacement engine core. This arrangement is facilitated by configuring the PT rotor 71 of FIG. 2 as a free rotor; e.g., a rotor decoupled from the core rotating structures. Configuring the PT rotor 71 as a free rotor may also reduce likelihood of damage to the engine core 34 in an unlikely event of foreign object damage (FOD) to the fan rotor 70 and its fan blades.

In some embodiments, the engine core 34 may be arranged coaxial with the fan rotor 70 and the geartrain 78. The present disclosure, however, is not limited to such an exemplary arrangement. For example, a centerline of the engine core 34 may alternatively be angularly offset from and/or (e.g., radially) displaced from a centerline of the fan rotor 70 and/or a centerline of the geartrain 78.

The turbine engine 20 is generally described above as a turbofan turbine engine. The present disclosure, however, is not limited to such an exemplary turbofan turbine engine configuration. The fan rotor 70, for example, may be configured as another type of propulsor rotor for generating propulsive thrust. Furthermore, the recovery system 110 may be included in a turbine engine configured with a single spool, with a dual spool (e.g., see FIG. 2), or with a more than two spool engine core. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A turbine engine with an axis, comprising:
   a fan section;
   a turbine engine core configured to power the fan section, the turbine engine core including a core compressor section, a core combustor section and a core turbine section;
   a bypass flowpath fluidly coupled with and downstream of the fan section;
   an engine housing comprising a cavity radially outboard of and axially overlapping at least one of the fan section or the bypass flowpath;
   an evaporator module within the cavity;
   a condenser module within the cavity; and
   a core flowpath extending sequentially through the core compressor section, the core combustor section, the core turbine section, the evaporator module and the condenser module;
   wherein the condenser module projects axially away from the fan section towards a forward end of the engine housing.

2. The turbine engine of claim 1, wherein the evaporator module extends radially across the bypass flowpath.

3. The turbine engine of claim 1, wherein the evaporator module extends circumferentially about the axis within the cavity between thirty degrees and one-hundred and sixty degrees.

4. The turbine engine of claim 1, wherein
   the core flowpath extends axially in a first axial direction along the axis into the evaporator module; and
   the core flowpath extends axially in the first axial direction along the axis out of the evaporator module.

5. The turbine engine of claim 1, wherein the condenser module extends circumferentially about the axis within the cavity between thirty degrees and one-hundred and sixty degrees.

6. The turbine engine of claim 1, wherein the condenser module includes a water separator disposed at a gravitational bottom side of the turbine engine.

7. The turbine engine of claim 1, wherein an exhaust out from the core flowpath is disposed radially outboard of the bypass flowpath.

8. The turbine engine of claim 1, further comprising:
a recovery system including the condenser module and the evaporator module;
the condenser module configured to condense water vapor flowing through the core flowpath into water, and the recovery system configured to collect the water; and
the evaporator module configured to evaporate at least some of the water into steam, and the recovery system configured to provide the steam to the turbine engine core.

9. The turbine engine of claim 8, wherein the recovery system is configured to provide the steam to the core combustor section.

10. The turbine engine of claim 1, further comprising a fuel system configured to inject hydrogen fuel into a combustion chamber of the core combustor section for combustion.

11. The turbine engine of claim 1, further comprising:
a flow circuit including the condenser module and a second condenser module, the flow circuit configured to circulate a working fluid through the condenser module and the second condenser module;
the second condenser module arranged radially inboard of the bypass flowpath.

12. The turbine engine of claim 11, further comprising:
a second bypass flowpath fluidly coupled with and downstream of the fan section;
the second bypass flowpath radially inboard of the bypass flowpath and extending through the second condenser module.

13. The turbine engine of claim 11, wherein
a port extends radially through the second condenser module; and
the evaporator module projects radially through the port.

14. The turbine engine of claim 1, further comprising:
a second evaporator module;
a second condenser module;
the core flowpath including a first heat exchange leg, a second heat exchange leg and a base leg;
the first heat exchange leg branching off from the base leg and extending sequentially through the evaporator module and the condenser module; and
the second heat exchange leg branching off from the base leg and extending sequentially through the second evaporator module and the second condenser module.

15. The turbine engine of claim 1, wherein the core turbine section is arranged axially between the fan section and the core compressor section.

16. The turbine engine of claim 1, further comprising:
a power turbine section arranged axially between the fan section and the turbine engine core; and
a rotating structure including a fan rotor and a power turbine rotor, the fan rotor within the fan section and the power turbine rotor within the power turbine section.

17. A turbine engine with an axis, comprising:
a fan section;
a turbine engine core configured to power the fan section, the turbine engine core including a core compressor section, a core combustor section and a core turbine section;
a bypass flowpath fluidly coupled with and downstream of the fan section;
an engine housing comprising a cavity radially outboard of and axially overlapping at least one of the fan section or the bypass flowpath;
an evaporator module within the cavity;
a condenser module within the cavity; and
a core flowpath extending sequentially through the core compressor section, the core combustor section, the core turbine section, the evaporator module and the condenser module;
wherein the core flowpath extends axially in a first axial direction along the axis into the condenser module; and
wherein the core flowpath extends axially in a second axial direction along the axis out of the condenser module.

18. A turbine engine with an axis, comprising:
a fan section;
a turbine engine core configured to power the fan section, the turbine engine core including a core compressor section, a core combustor section and a core turbine section;
a bypass flowpath fluidly coupled with and downstream of the fan section;
an evaporator module including an inner section, an outer section and an intermediate section fluidly coupled with and extending radially between the inner section and the outer section, the inner section radially inboard of and axially overlapped by the bypass flowpath, and the outer section radially outboard of and axially overlapping at least one of the fan section or the bypass flowpath;
a condenser module; and
a core flowpath extending sequentially through the core compressor section, the core combustor section, the core turbine section, the evaporator module and the condenser module.

19. A turbine engine, comprising:
a first rotating structure rotatable about an axis, the first rotating structure including a propulsor rotor and a power turbine rotor;
a turbine engine core including a second rotating structure and a combustor, the second rotating structure including a core compressor rotor and a core turbine rotor, and the power turbine rotor arranged axially between the propulsor rotor and the second rotating structure;
a recovery system including an evaporator module and a flow circuit, the flow circuit including a first condenser module and a second condenser module with a port extending through the second condenser module, and the flow circuit configured to circulate a working fluid through the first condenser module and the second condenser module; and
a core flowpath extending sequentially across the core compressor rotor, the combustor, the core turbine rotor, the power turbine rotor, the evaporator module and the first condenser module, and a portion of the core flowpath crossing the second condenser module through the port.

* * * * *